US008310532B2

(12) United States Patent
Mertz et al.

(10) Patent No.: US 8,310,532 B2
(45) Date of Patent: Nov. 13, 2012

(54) SYSTEM AND METHOD FOR PRODUCING AN OPTICALLY SECTIONED IMAGE USING BOTH STRUCTURED AND UNIFORM ILLUMINATION

(75) Inventors: Jerome Mertz, Boston, MA (US); Daryl Lim, Brookline, MA (US); Kengyeh K. Chu, Brighton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 12/994,413

(22) PCT Filed: Jun. 3, 2009

(86) PCT No.: PCT/US2009/046122
§ 371 (c)(1),
(2), (4) Date: Jan. 10, 2011

(87) PCT Pub. No.: WO2009/149178
PCT Pub. Date: Dec. 10, 2009

(65) Prior Publication Data
US 2011/0109736 A1    May 12, 2011

Related U.S. Application Data

(60) Provisional application No. 61/130,999, filed on Jun. 5, 2008.

(51) Int. Cl.
*H04N 7/18* (2006.01)
*G06K 9/40* (2006.01)
(52) U.S. Cl. .......................... 348/79; 382/260
(58) Field of Classification Search .............. 348/79; 382/260
See application file for complete search history.

(56) References Cited

U.S. PATENT DOCUMENTS 6,309,348 B1    10/2001    Schmidt et al. .............. 600/162
(Continued)

FOREIGN PATENT DOCUMENTS

GB    2416443    1/2006
(Continued)

OTHER PUBLICATIONS

Bozinovic, N., et al., "Fluorescence Endomicroscopy With Structured Illumination," *Optics Express* [Online] vol. 16, No. 11, May 28, 2008, pp. 8016-8025.
Ryu, J., et al., "Application of Structured Illumination in Nano-Scale Vision," 2003 *IEEE Computer Society Conference on Computer Vision and Pattern Recognition*, Jun. 16, 2003, pp. 1-7.

(Continued)

*Primary Examiner* — Jayanti K. Patel
*Assistant Examiner* — Richard Torrente
(74) *Attorney, Agent, or Firm* — Sunstein Kann Murphy & Timbers LLP (57) ABSTRACT

A first image data set of the real-world object is received at a processor where the real-world object was illuminated with substantially uniform illumination. A second image data set of the real-world object is received at the processor where the real-world object was illuminated with substantially structured illumination. A high pass filter is applied to the first-image data set to remove out-of-focus content and retrieve high-frequency in-focus content. The local contrast of the second-image data set is determined producing a low resolution local contrast data set. The local contrast provides a low resolution estimate of the in-focus content in the first-image data set. A low pass filter is applied to the estimated low resolution in-focus data set, thus making its frequency information complementary to the high-frequency in-focus data set. The low and high frequency in-focus data sets are combined to produce an optically-sectioned data set of the real-world object.

26 Claims, 10 Drawing Sheets

U.S. PATENT DOCUMENTS

| | | | |
|---|---|---|---|
| 6,958,815 B2 | 10/2005 | Bevilacqua et al. | 356/445 |
| 7,335,866 B2 | 2/2008 | Backs et al. | 250/201.3 |
| 7,460,248 B2 | 12/2008 | Kurtz et al. | 356/521 |
| 7,477,931 B2 | 1/2009 | Hoyt | 600/476 |
| 8,044,996 B2 * | 10/2011 | Rice et al. | 348/50 |
| 2004/0051847 A1 | 3/2004 | Vilser | 351/200 |
| 2005/0228229 A1 | 10/2005 | Harris | 600/168 |
| 2008/0013900 A1 | 1/2008 | Harris | 385/117 |
| 2008/0097225 A1 | 4/2008 | Tearney et al. | 600/478 |
| 2008/0101716 A1 * | 5/2008 | Ho | 382/266 |
| 2008/0137363 A1 | 6/2008 | Harris | 362/574 |
| 2008/0266655 A1 | 10/2008 | Levoy et al. | 359/368 |
| 2009/0046164 A1 | 2/2009 | Shroff et al. | 348/222.1 |

FOREIGN PATENT DOCUMENTS

| | | |
|---|---|---|
| WO | WO 99/47041 | 9/1999 |
| WO | WO 2008/124832 | 10/2008 |

OTHER PUBLICATIONS

Authorized Officer, European Patent Office, Eckert, Lars, *The International Search Report and the Written Opinion of the International Searching Authority and Notification of Transmittal of the International Search Report and the Written Opinion of the International Searching Authority, or the Declaration*, International Application No. PCT/US2009/046122, International Searching Authority, Sep. 8, 2009, 18 pages.

\* cited by examiner

SYSTEM AND METHOD FOR PRODUCING AN OPTICALLY SECTIONED IMAGE USING BOTH STRUCTURED AND UNIFORM ILLUMINATION

PRIORITY

The present patent application is a Patent Cooperation Treaty Patent Application that claims priority from U.S. Provisional Patent Application No. 61/130,999 filed on Jun. 5, 2008 entitled "Method of Optical Sectioning with Hybrid Structured and Uniform Illumination Imaging", which is incorporated by reference herein in its entirety.

GOVERNMENT RIGHTS

This invention was made with government support under Contract No. EB007338 awarded by the National Institutes of Health. The Government has certain rights in the invention.

TECHNICAL FIELD

The present invention relates to imaging, and more particularly to optically sectioned images.

BACKGROUND ART

Typically, whole biological samples that are to be visualized using a microscope are sliced into a thin layer and mounted in order to see the lateral structure. Thus, the sample takes on a two dimensional property by substantially reducing the thickness of the sample, so that the structure within the plane of the slice can be seen without added background from other structures that reside outside of the plane. However, some structures, including many in-vivo structures, can not be sliced.

It is known in the prior art to use confocal fluorescence microscopy to image an in-vivo structure at sub-cellar resolutions. Similarly, it is well known that standard wide-field fluorescence microscopy does not provide optical sectioning for laterally uniform objects. Wide-field techniques are hampered by their inability to reject out-of-focus background structures, thereby leading to low signal contrast.

Techniques have been developed that enable whole-mount and in-vivo samples to be examined by optical sectioning. These techniques all function to minimize or eliminate out-of-focus background (i.e. background arising from structures that are not within the focal plane). Several strategies have been devised to provide for optical sectioning. For example, wide-field microscopy may employ dynamic speckle illumination to obtain an optically sectioned image. When dynamic speckled illumination is used, a fluorescent structure is illuminated with random speckle pattern(s). Optical sectioning is then obtained by calculating the contrast of the image fluctuations in time. Thus, many images must be taken. One problem with this technique is that it is slow and generally requires several tens of images to produce a final sectioned image of reasonable quality.

Other techniques include using a grid pattern to illuminate the structure to be visualized. The pattern illumination is shifted by a portion of the grid period and an image is captured with each shift. The data from the multiple images is processed to remove the out-of-focus background. One drawback of this technique is that the resultant images often have a striped appearance due to motion related artifacts. Since the images are obtained sequentially, any movement of the structure to be visualized or the imaging device results in misregistration between images at a processor and therefore, a degradation of the processed image quality.

SUMMARY OF THE INVENTION

In a first embodiment of the invention there is provided a method for creating an optically sectioned image data set using both a structured illumination image data set and a uniform illumination data set. The structured and uniform illumination data sets enable the calculation of low resolution image structure that exhibits optical sectioning even at DC spatial frequency. The uniform illumination data set provides complementary high resolution image structures that exhibits intrinsic optical sectioning. The fusion of both image sets provides a final image data set that exhibits optical sectioning across the full bandwidth of the imaging system. The methodology may be employed in a processor. The imaged data may result from a microscope, an endomicroscope, or another imaging device that is provided with both substantially uniform illumination and structured illumination.

The imaging method includes receiving at a processor a first image data set of the real-world object that was illuminated with substantially uniform illumination and receiving a second image data set of the real-world object that was illuminated with substantially structured illumination. The first image data set is processed to produce a high-frequency in-focus data set that eliminates out-of-focus data. The second image data set is processed to produce a low-frequency in-focus data set. The low and high frequency data sets can be combined together and then displayed on a display device producing an image that is the full resolution of the imaging array.

The first image data set is processed by applying a high pass filter to substantially remove out-of-focus content and obtain a high frequency in-focus image data set. The second image data set is processed by determining the local contrast producing a low resolution local contrast data set. The local contrast may be determined using a number of different algorithms. For example, the local contrast may be determined by calculating the local image standard deviation, using single sideband demodulation or using double sideband demodulation. Additionally, the low resolution local contrast data set is multiplied with the first image data set to extract low resolution in-focus content from the first image data set. Finally, a low pass filter is applied to the low resolution in-focus content. The low pass filter may be complementary with the high pass filter.

In certain embodiments of the invention the local contrast is adjusted to compensate for object contrast using the first image data set. In other embodiments, the local contrast may be adjusted to compensate for noise-induced contrast in the second image data set using the first image data set.

The first and second image data sets may be recorded with an optical imager by exposing the real-world object to near uniform illumination and structured illumination respectively. The optical imager may include an optical detector array and the optical imager may include one or more sources of illumination.

The methodology may be employed in discrete electronics or in a computer program for use on a computer system.

The invention may also be embodied as a system. The system may include one or more sources of illumination along with a spatial pattern generator. Further, the system may include an optical detector array and a processor. The processor receives from the optical detector array a first image data set and a second image data set wherein the first image data set is produced in response to the illumination source and the second image data set is produced in response to the illumination source and the spatial pattern generator. The processor produces an optically-sectioned image by combining high frequency in-focus data from the first image data set with low frequency in-focus data obtained from the first and second image data sets. The spatial pattern generator may be any device that allows for the creation of a spatial light pattern including a spatial light modulator and a diffuser. The system may also include a display for displaying the optically sectioned image data set of the real-world object.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires: The term "object signal" shall mean a signal produced by an object such as through reflectance or fluorescence or other energy principle. The terms "imaging system" and "optical imager" shall mean a system that includes at least a detector array (e.g. CCD camera, CMOS camera, etc.). An imaging system may also include one or more sources of illumination. Illumination may result from energy produced by a source (e.g. lamp, laser, diodes etc.). The term "structured illumination" means illumination that produces a spatially varying signal i.e. a signal that exhibits non-uniform contrast. Structured illumination may be spatially random or patterned. The term "uniform illumination" means that the illumination does not significantly vary with space, such that a detector array would not register variations at different spatial positions. It should be noted that structured illumination can be made to mimic uniform illumination if it is multiply randomized during the integration time of the imaging array electronics. The term "pattern generator" refers to a device that can toggle the illumination between uniform and structured states.

The system and methods disclosed herein provide for imaging a real-world object, such as a cellular mass. The real-world object has a three dimensional shape including a dimension of depth about a depth axis. The imaging method provides for an optically sectioned image, such that a plane of the real-world object is imaged wherein the plane traverses the depth axis. Embodiments of the invention use both structured illumination and uniform illumination. A first data set of the real-world object is obtained wherein structured illumination is directed through an optical path to the real-world object and the real-world object produces an object signal that is received by an imaging system that includes an optical imaging array. The optical imaging array produces a data set that is representative of the real-world object. The real-world object is also exposed to substantially uniform illumination and the optical imaging array produces a data set that is representative of the real-world object. The two data sets that result from the structured and uniform illumination are numerically processed. The uniform illumination data set is passed through a high pass filter to filter out the low frequency information that is out-of-focus with respect to the optically sectioned plane. The local contrast of the structured illumination data set is determined. The local contrast data set is used to locally extract the proportion of the uniform illumination data set that is in focus, producing a low resolution estimate of the in-focus data set. The low resolution data set is passed through a low pass filter that is complementary to the high pass filter used for the uniform illumination data set. The filtered data sets are then combined together to produce an in-focus data set that contains all spatial frequencies within the bandwidth of the imaging device, and can be displayed on a display device.

Figure 1:
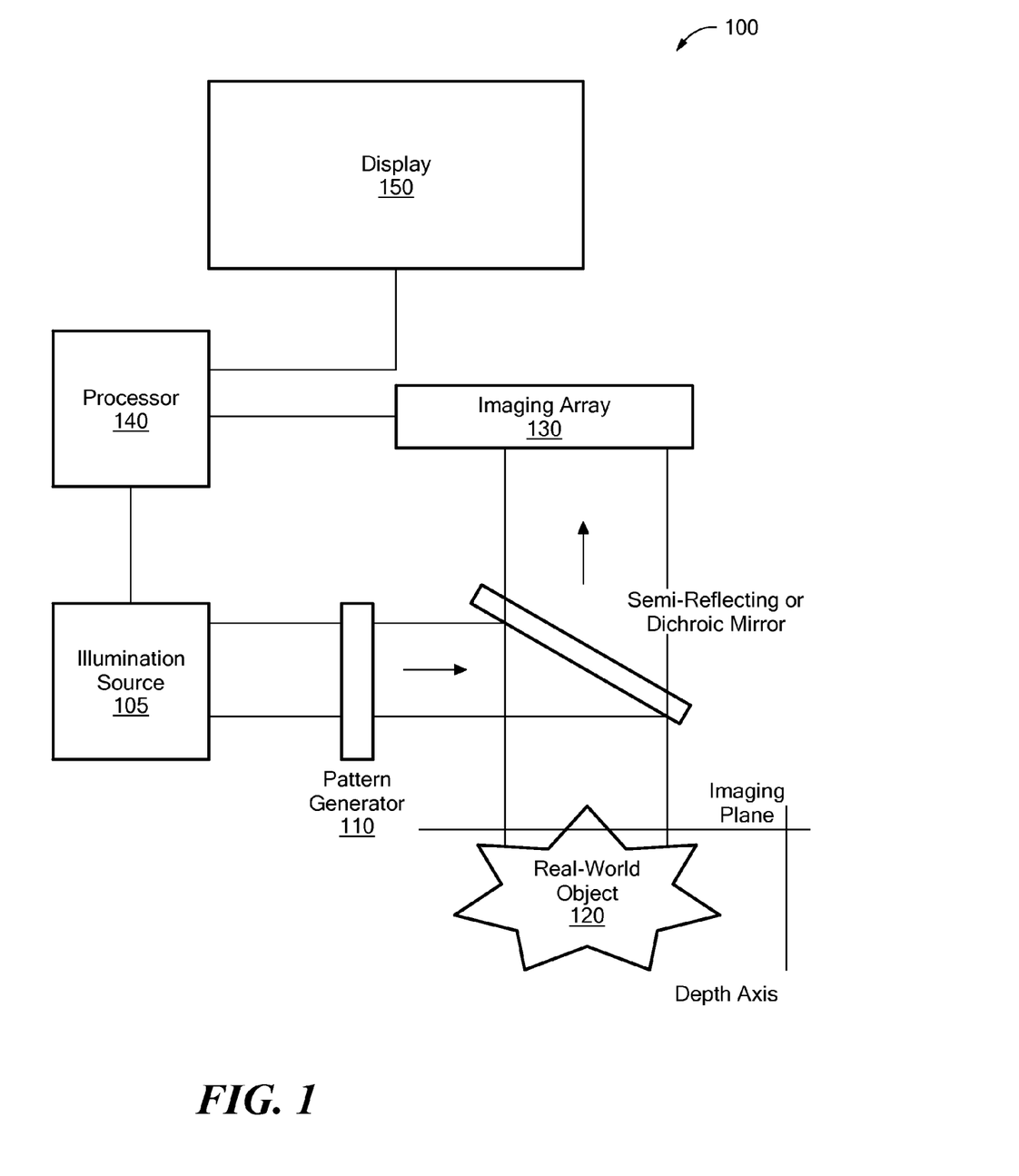
FIG. 1 is a first embodiment of the system for producing an optically sectioned image; in this embodiment, the illumination and detection paths are collinear at the object.

FIG. 1 is a first embodiment of the system 100 for producing an optically sectioned image. The system 100 includes a source of illumination 105 that illuminates an object 120 to be imaged. The illumination source 105 may be a laser light, diode light, incandescent light or some other light source. For example, the optical source may be a laser beam that is used in microscopy. The object 120 to be imaged may be an in vivo cellular structure or other three-dimensional real-world object. The system also includes a pattern generator 110 that can switch the state of the illumination between uniform illumination and structured illumination. In some embodiments (e.g. FIG. 1E) that use a laser illumination source, the structured illumination can be a speckle pattern. In this embodiment, the pattern generator can be a simple diffuser plate switched between a fixed state (thereby generating a fixed speckle pattern) and a rapidly moving state (thereby generating a rapidly randomized speckle pattern to mimic uniform illumination). In other embodiments (e.g. FIG. 1B), there may be more than one source of illumination and a fixed (i.e. non-switching) pattern generator may be associated with a single source. The light is directed along the optical path or paths to the real-world object. In response to the light, the real-world object generates an object signal that is directed to an imaging array 130. The imaging array 130 has a plurality of sensors for sensing the object signal. The imaging array 130 converts the object signal into a plurality of electrical signals. The electrical signals may be either digital signals or analog signals. In the case of an analog signal, the analog signal is converted to a digital signal by passing the object signal through an analog-to-digital converter. The resulting digital data set is processed in processor 140. The digital data set may then be saved for later retrieval or may be directed to a display 150 for viewing.

In operation, the system captures at least two data sets. The first data set is captured by the imaging array such that the real-world object is substantially uniformly illuminated. Substantially uniform illumination implies that illumination incident on the real-world object contains little or no spatial structure. The data set is provided to the processor. The second data set is captured by the imaging array such that the real-world object is illuminated with substantially structured illumination. Substantially structured illumination implies that illumination incident on the real-world object contains highly contrasted spatial structure (e.g. a speckle pattern, a grid pattern, a checkerboard pattern, etc.). The second data set is provided to the processor. The first data set is high-pass filtered in order to retain the high-frequency image content. This high-frequency content is inherently in focus. The second data set undergoes contrast extraction. Thus, local contrast of the spatial variations in the second data set is evaluated using a method such as demodulation or measuring local standard deviation. The local contrast information provides an estimate of the proportion of the uniform illumination data set that is in focus. Thus, a multiplication of the local contrast information with the uniform illumination data set provides a low resolution estimate of the in focus content in the uniform illumination data set. This low resolution in-focus data set is then low-pass filtered to obtain the low frequency in-focus image content. The low pass filter is chosen to be complementary to the high-pass filter used previously to obtain the high-frequency in-focus image. The high frequency image content of the first data set and the low frequency image content derived from the contrast data are then combined together to form a combined data set that represents the in-focus content of the real-world object.

Structured illumination can be generated using a variety of techniques. For example, a physical grid or checkerboard pattern may be imaged to the real-world object; a multiple-beam laser interference technique can be used to generate fringe patterns; or diode arrays and accousto-optic deflectors can be used to generate well-defined patterns. Additionally, a variety of apparatus may be used to switch between the structured and uniform illumination. For example the structured illumination may be randomized to obtain the uniform illumination. Additionally, rapid toggling may be performed if spatial light modulators, diode arrays, or acousto-optic deflectors are used as the illumination source. In a multiple illumination source embodiments, a structured illumination pattern and uniform illumination pattern may be switched on and off alternately. One of ordinary skill in the art would recognize that there are other ways to create and switch between structured and uniform illumination based on the number of light paths, sources of illumination, and spatial pattern generators.

Figure 1A:
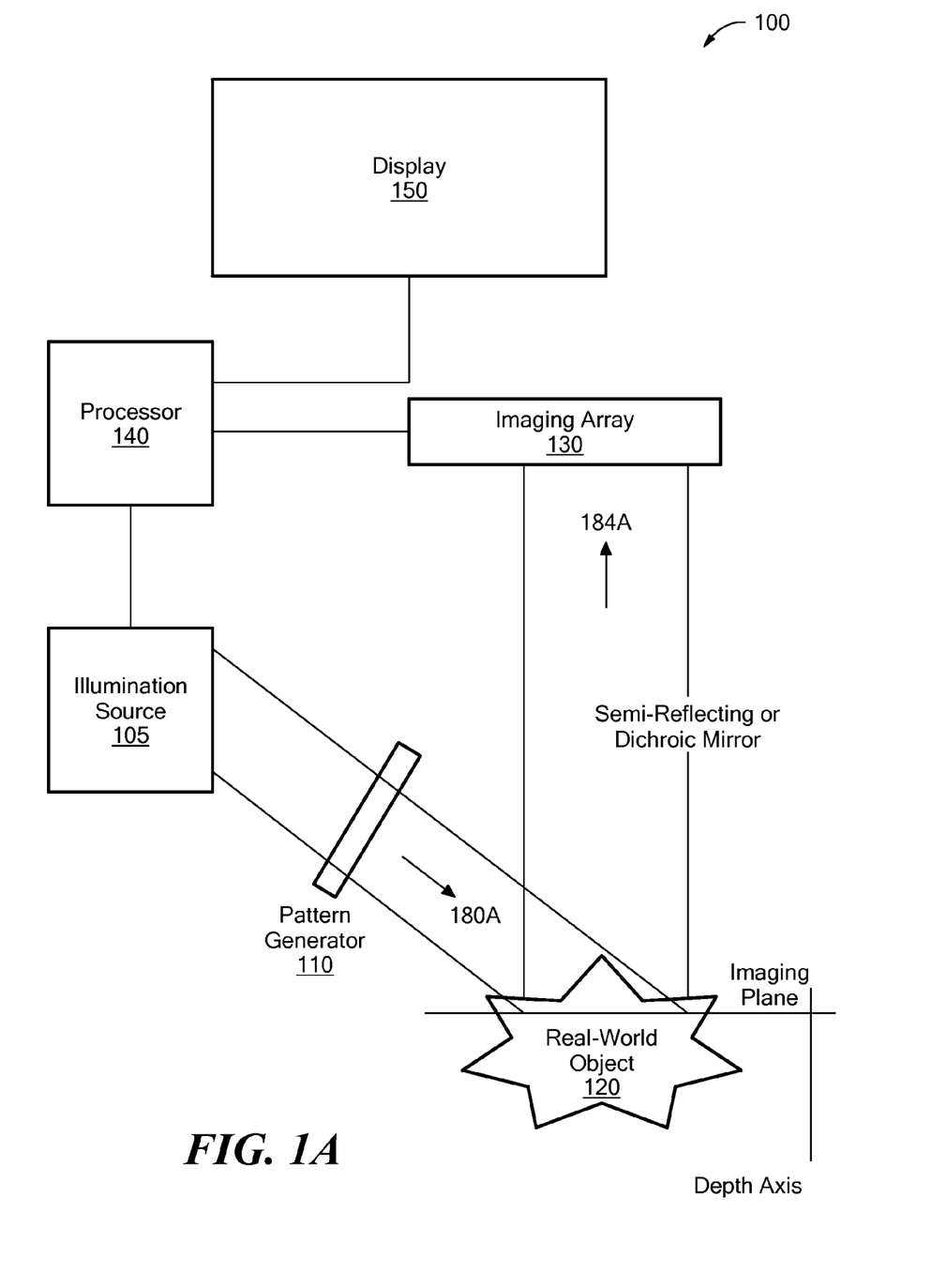
FIG. 1A shows a variation of the system of FIG. 1 wherein the illumination optical path is distinct from the detection optical path.
Figure 1B:
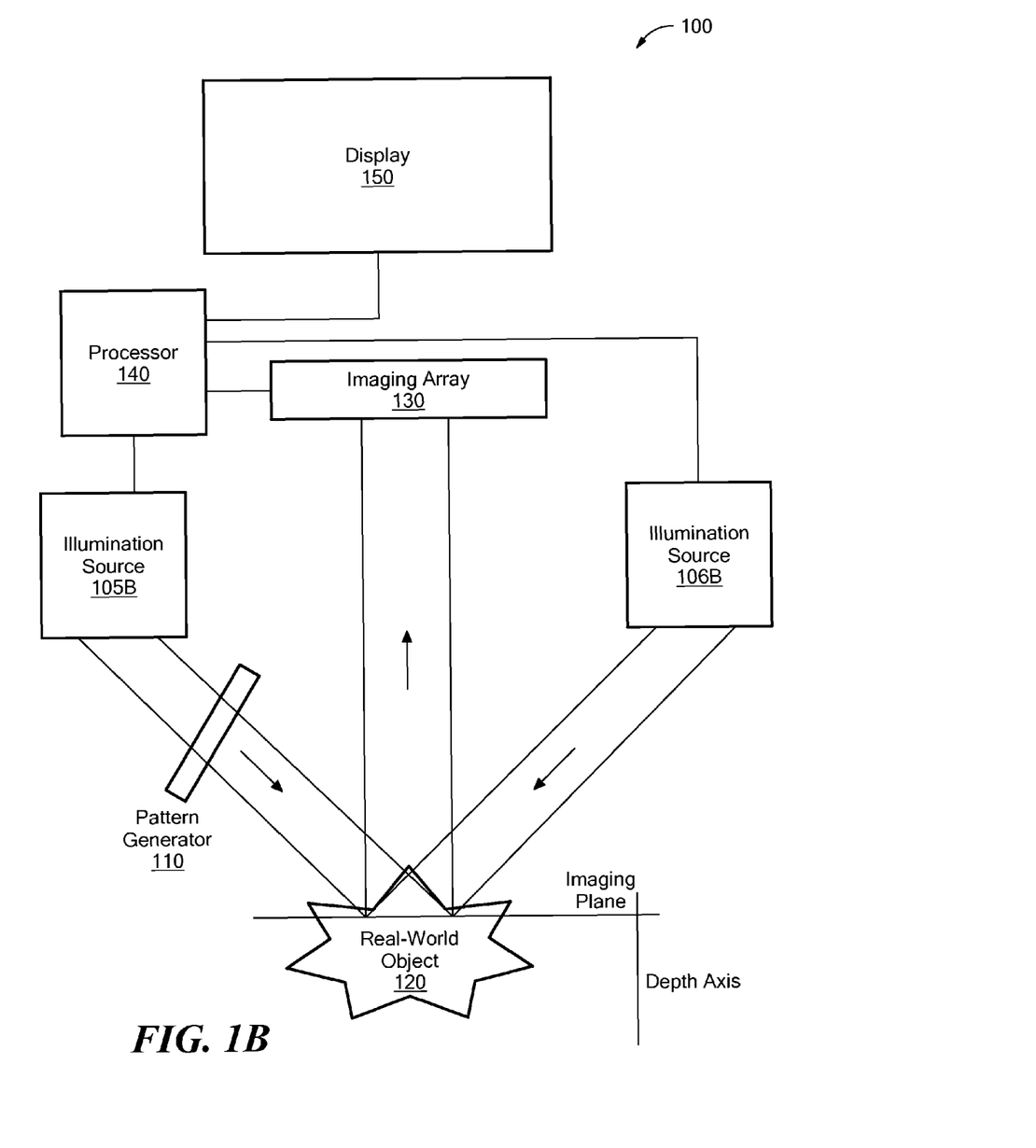
FIG. 1B shows a variation of the system of FIG. 1 wherein two illumination sources are used, one producing uniform illumination and another producing structured illumination. In this embodiment, the processor turns on and off the illumination sources alternately.

It should be recognized by one of ordinary skill in the art that the optical path between the illumination source and the real-world object may be different from the optical path (imaging path) between the real-world object and the imaging array as shown in FIGS. 1A, 1B, 1C and 1D. FIG. 1A shows a variation of the system of FIG. 1 wherein the illumination optical path 180A is distinct from the detection optical path 185A FIG. 1B shows two separate illumination sources 105B and 106B. The pattern generator 110 may be fixed in this embodiment and the processor turns on and off the illumination sources 105B and 106B alternately.

Figure 1C:
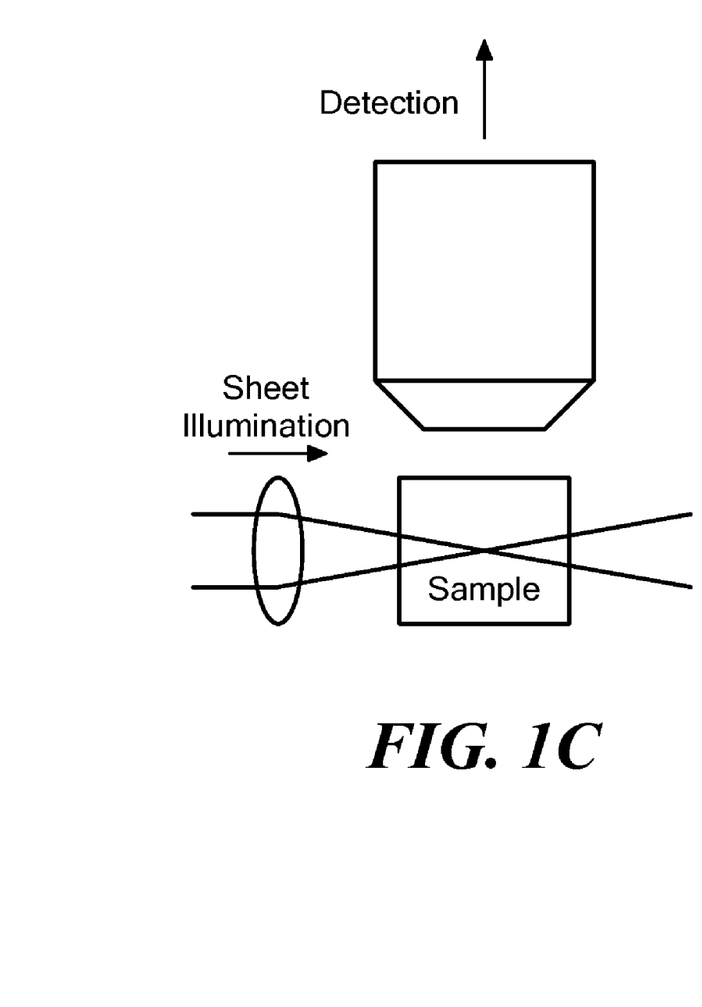
FIG. 1C shows a variation of the system of FIG. 1A wherein planar, or sheet, illumination is used.
Figure 1D:
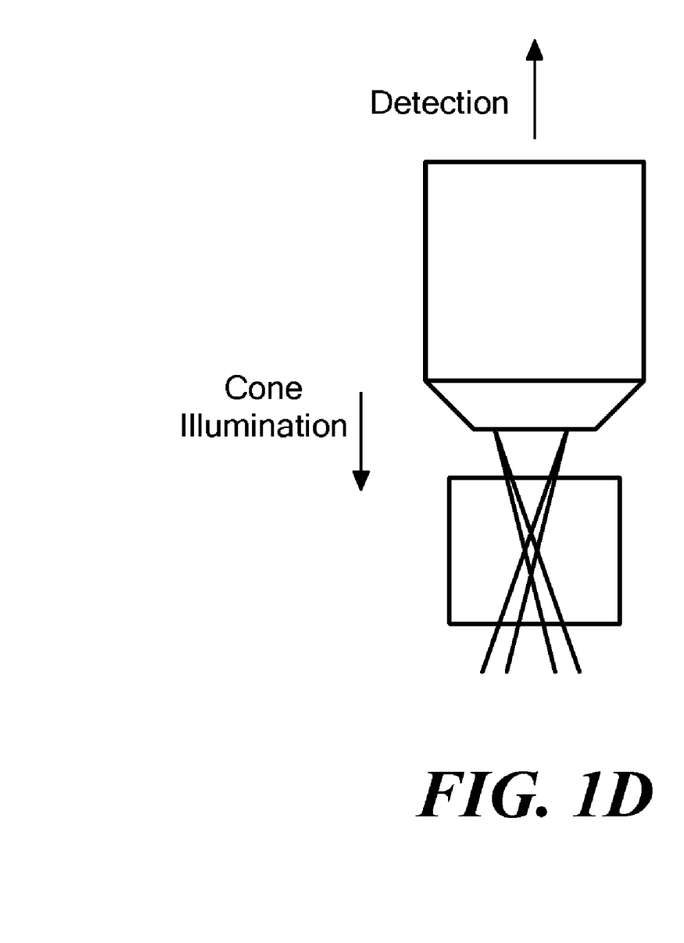
FIG. 1D shows a variation of the system of FIG. 1 wherein conical illumination is used.

FIG. 1C shows illumination in the form of a light sheet that is transverse or oblique to the detection path. The light sheet can be created with the use of a cylindrical lens, a holographic diffuser, or a scanning laser beam. FIG. 1D shows an illumination source wherein the illumination is approximately in the form of a cone. Cone illumination can be created with the use of an axicon or a holographic diffuser plate. The configurations of FIGS. 1C and 1D reduce the amount of out-of-focus background that is detected by the imager. Thus, the concomitant shot noise is reduced and more imager dynamic range is available for in-focus signal detection.

Figure 1E:
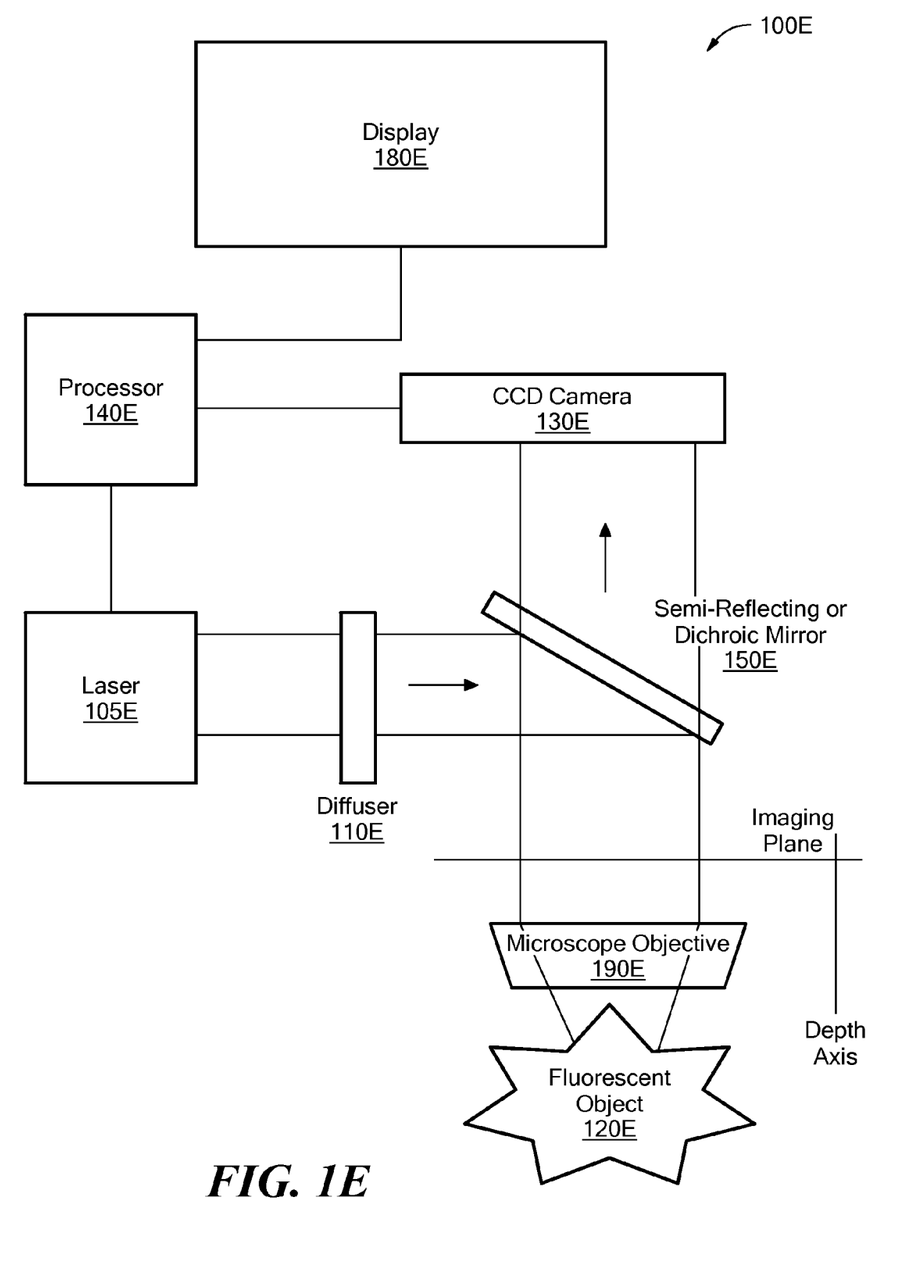
FIG. 1E is an alternative embodiment of the system for producing an optically sectioned image. In this embodiment, the structured illumination is a speckle pattern produced by a laser beam propagating through a diffuser. The uniform illumination is mimicked by rapidly randomizing the speckle pattern by moving the diffuser.

FIG. 1E shows a microscope system embodiment for producing an optically sectioned image using both structured illumination and uniform illumination. A laser beam is generated by a laser 105E and the light is directed onto a moveable diffuser 110E to create a fixed speckle (structured illumination) or a rapidly randomized speckle pattern (effectively uniform illumination) incident on the real-world fluorescent object 120E through a microscope objective 190E. The resultant fluorescence is isolated with a dichroic 150E and recorded with a CCD camera 130E. The digital data for each of the structured and uniform images is provided to a processor 140E. The processor 140E processes the data sets to remove out of focus data and then combines the in-focus data sets. The in-focus data can then be displayed on a display device 180E.

Figure 1F:
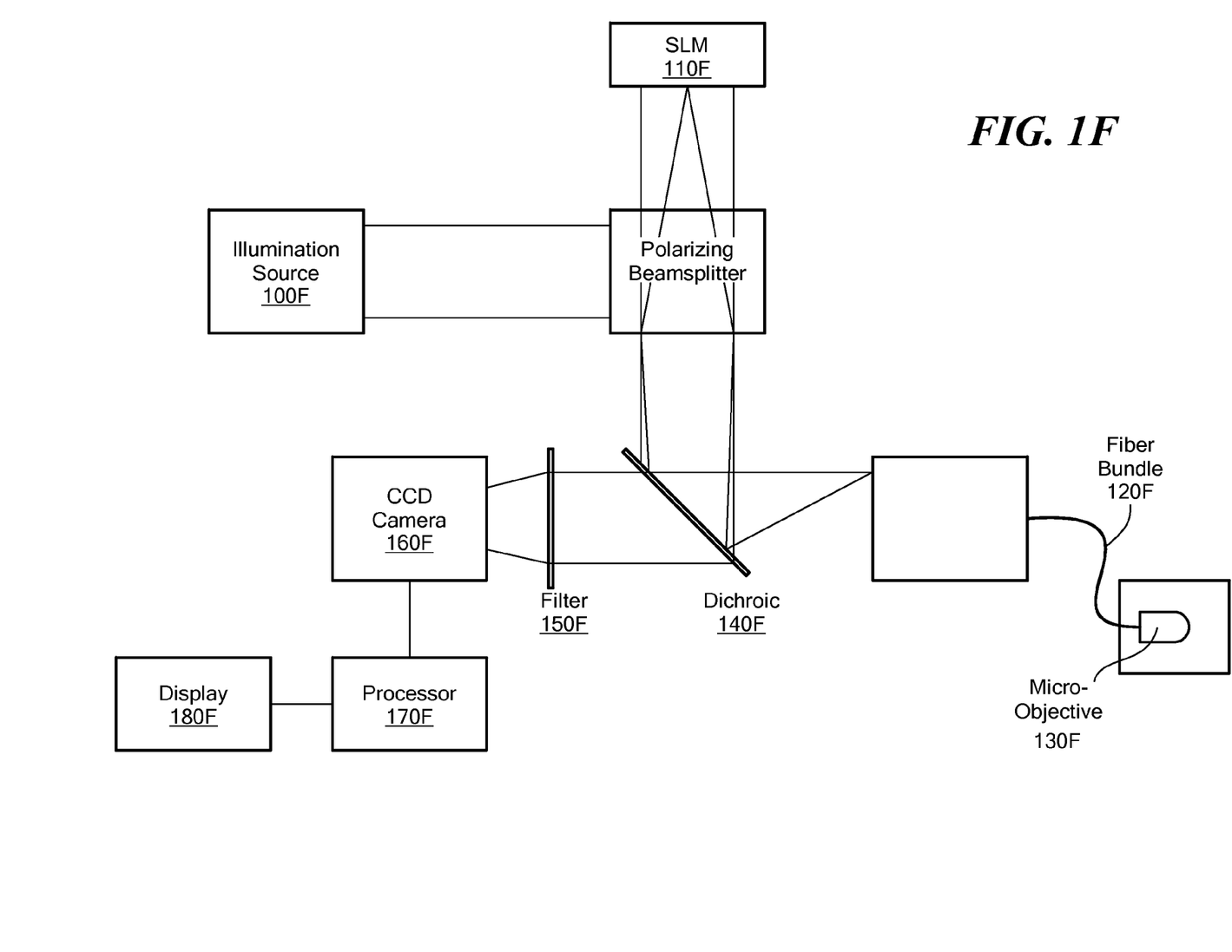
FIG. 1F is an alternative embodiment of the system for producing an optically sectioned image. In this embodiment, the pattern generator is a spatial light modulator, and the imaging is performed through an imaging fiber bundle.

FIG. 1F shows an endomicroscope system embodiment for producing an optically sectioned image using both structured illumination and uniform illumination. An illumination source 100F generates light that is directed onto a spatial light modulator 110F to create grid and uniform illumination patterns which are then projected into an imaging fiber bundle 120F equipped with a distal micro-objective 130F. The resultant fluorescence is isolated with a dichroic 140F and emission filter 150F and recorded with a CCD camera 160F. The digital data for each of the structured and uniform images is provided to a processor 170F. The processor 170F processes the data sets to remove out of focus data and then combines the in-focus data sets. The in-focus data can then be displayed on a display device 180F.

Figure 2:
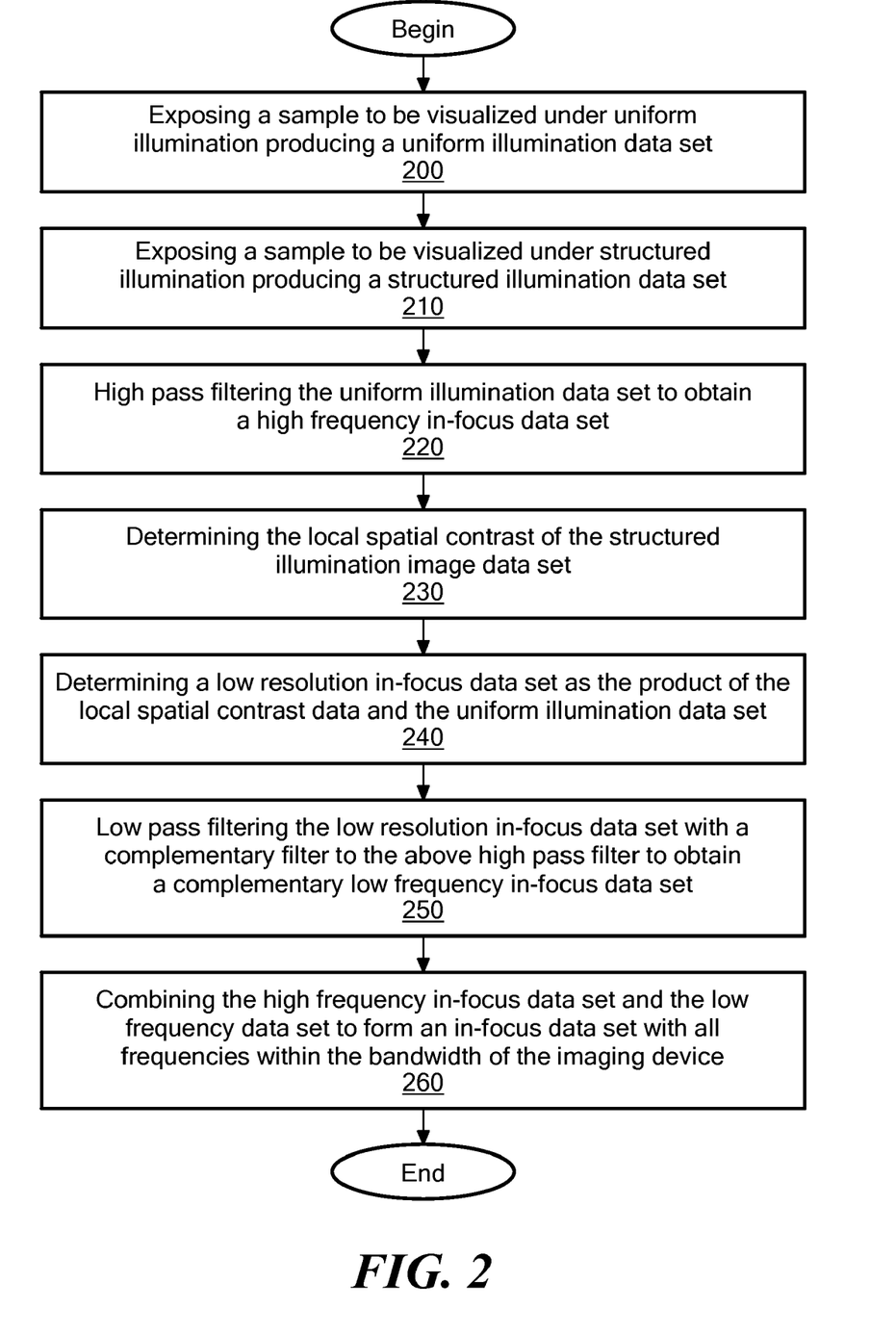
FIG. 2 is a flow chart of the generalized methodology for producing an optically sectioned image using both uniform illumination and structured illumination.

FIG. 2 shows a flow chart of the process for producing an optically sectioned data set of an object for display using both uniform illumination and structured illumination. The object is exposed to uniform illumination (or illumination that has been effectively rendered uniform by randomization) and an image of the object is captured using a detector array (200). The object is also exposed to structured illumination (spatially random, patterned, speckled etc.) and an image of the object is captured with a detector array (210). The detector array may be the same or different for both the structured illumination and uniform illumination. Thus, at least two images are produced. The uniform illumination image data set is passed through a high-pass filter to extract the high-frequency component of the uniform illumination data set (220). This high-frequency component represents intrinsically in-focus data because, upon imaging, only in-focus data is highly resolved (i.e. contains high frequencies). The structured illumination data set undergoes contrast extraction (230). The contrast of the structured illumination data set becomes small for object signals that are out-of-focus. The local contrast of the imaged structure thus provides a measure of the degree to which the object is in-focus or contains in-focus elements. Techniques that can be used to measure the local structure contrast include single sideband demodulation and double sideband demodulation and other techniques to measure the local variance of data from the image data set. The local contrast data set provides a low resolution estimate of the proportion of the uniform illumination data set that is in focus. A multiplication of the local contrast data set with the uniform illumination data set thus provides a low resolution estimate of the in-focus image (240). In an alternative embodiment, steps 230 and 240 can be combined into a single step by subtracting the uniform illumination data set from the structured illumination data set and taking the absolute value. The low resolution estimate of the in-focus image is further processed by applying a low pass filter to it that is complementary to the high pass filter applied in step 220, thereby providing a low frequency in-focus data set (250). The high and low frequency data is then combined to form an in-focus data set that contains all frequencies within the bandwidth of the imaging device (260).

In certain embodiments additional processing may be warranted. For example, several factors can contribute to the image modulation contrast of the data set exposed to structured illumination including the illumination structure, the object structure and noise structure (e.g. shot noise). Thus, it is beneficial to remove the image modulation contrast that can be associated with noise and the object structure. This information can be inferred from the uniform illumination image. Object contrast can be at least partially corrected for by dividing the structured illumination image by the uniform illumination image prior to performing local modulation contrast measurements. Alternatively, the structured illumination image can be directly demodulated by subtracting out the uniform illumination image and taking an absolute value for each location (e.g. pixel) of the array. Alternatively still, the contrast of the uniform illumination data set can be extracted out from the contrast of the structured illumination data set based on a knowledge of how the object contrast influences the contrast in the structured illumination data set. The uniform illumination data set can also provide an estimation of the bias introduced by shot noise in the measured modulation contrast using prior shot noise statistics.

As expressed above, the low and high frequency in-focus image data are combined together to form a full resolution image. It is desirable to avoid weighting imbalances between these data sets in order to obtain a reliable representation of the real-world object to be imaged. One way to accomplish this is to infer any weight discrepancy in the data in areas where there is frequency overlap between the low and high frequency data sets. Alternatively, one can infer any weight discrepancy between the low frequency data set and the uniform illumination data set in the mid-range frequency regions. Once the weight discrepancy has been determined, it may be corrected for by multiplying either the low or high frequency in-focus data sets with the appropriate weighting factor. The weighting factor may be spatially independent as a first approximation, or it may be spatially dependent when more accuracy is desired. Alternatively still, image fusion may be performed using techniques involving discrete wavelet transforms techniques that combine images with differing resolutions.

Different signals from the real-world object may be used for imaging. For example, the imaged signal may result from fluorescence. In other embodiments, reflectance imaging may be employed. Additionally, structured and uniform illumination can be performed with different color sources. By using a color camera (i.e. image array), imaging can be performed simultaneously with one color (i.e. blue) representing the structured illumination image and another color (i.e. green) representing the uniform illumination image. As such, red would be freely available. Thus, red could provide an extra image using another structured illumination pattern (e.g. different spatial frequency, phase, orientation, granularity, etc.). This would provide additional information to improve the selection of in-focus image content.

It should be recognized by one of ordinary skill in the art that although, the disclosure discusses using a single uniform illumination data set and a single structured illumination data set, more than one structured illumination data set (i.e. image) can be used to obtain a better estimate of the low frequency in focus image. Additional structured image data sets wherein the structures for each image are different could be used in combination to provide additional information about the low frequency components of the object being imaged.

In a different embodiment of the invention, two or more complementary structured images could be used and combined together to construct a uniform illumination image. For example, two complementary checkerboard or grid patterns could be used to produce two structured illumination images. The two structured images can provide additional information about the low frequency information of the object being imaged by using a Max-Min algorithm for example. In addition, the sum of the complementary images could then provide the data set for the uniform illumination image.

It should be noted, that the imaging techniques described herein are not limited to imaging biological materials and may be useful in other scientific area requiring optical sectioning.

Figure 3:
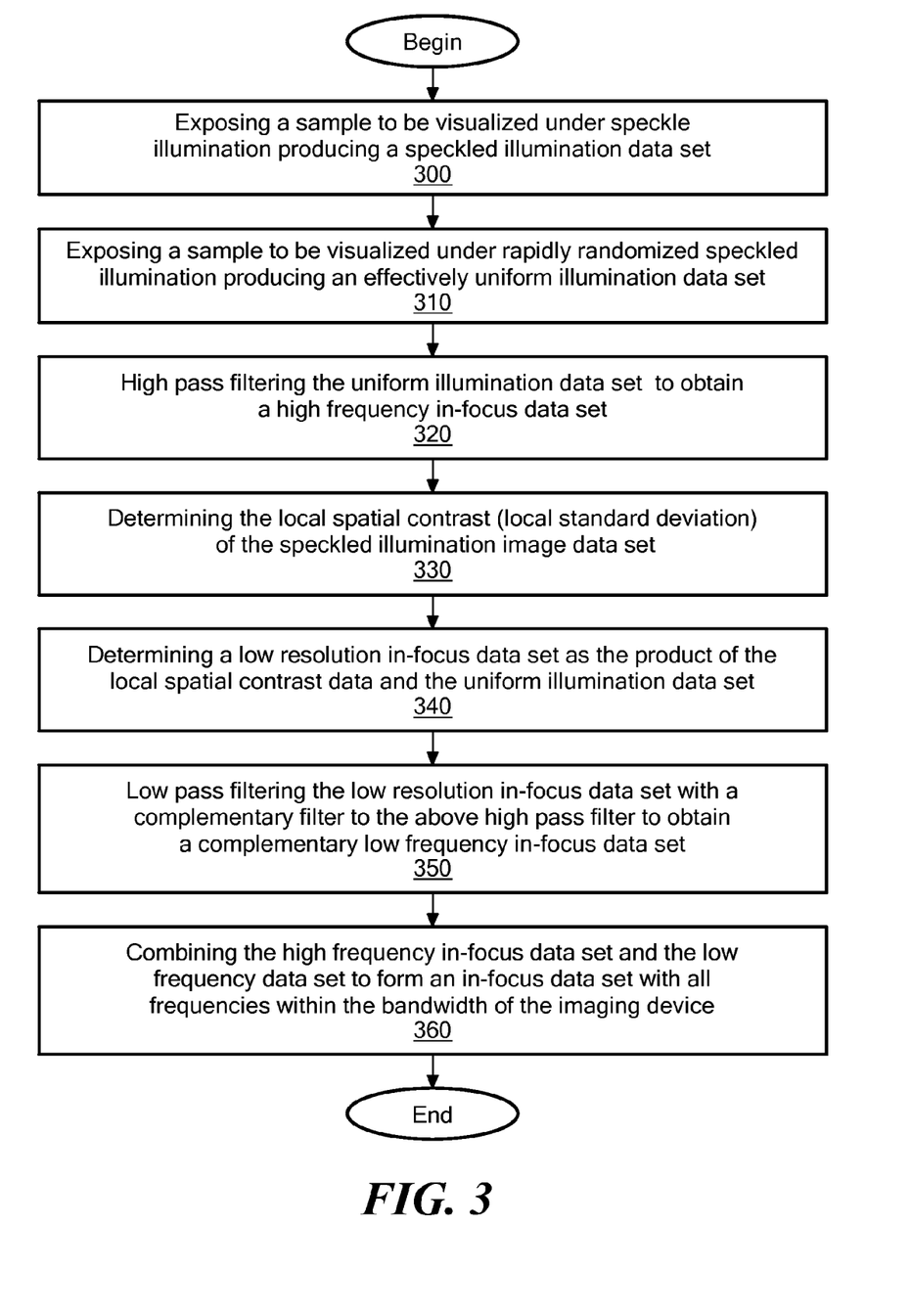
FIG. 3 is a flow chart of the methodology for producing an optically sectioned image using speckle illumination as the structured illumination.

FIG. 3 is a more specific flow chart of the generalized flow chart of FIG. 2 that uses speckle illumination as the structured illumination. A single speckle illumination image $I_n(p)$ is processed with a uniform illumination image $I_u(p)$ (where p are the image coordinates) to produce an in-focus image about a focal plane while removing information about structures that are out of the focal plane. In this embodiment, the phase front of a laser beam is randomized upon transmission through a diffuser plate and a resultant speckle pattern is projected into a sample via a microscope objective. In one embodiment, the system of FIG. 2E could be used. Two fluorescence images are then acquired. One with the diffuser plate fixed and the other with the diffuser plate in motion. In the latter case, the speckle pattern is randomized rapidly compared to the camera exposure time so that the image is equivalent to an image acquired with uniform illumination. A processor receives the structured illumination image data and the uniform illumination data. (300 and 310).

The high resolution/high frequency information is next obtained from the uniform illumination image $I_u(p)$ by applying a high pass filter (HP) to $I_u(p)$. The cutoff frequency $K_c$ of HP is defined such that such that $HP(K_c)=\frac{1}{2}$. The resultant high frequency in-focus data is denoted by $I_{HP}(p)$ (320).

In order to obtain the low frequency/low resolution in-focus information the local spatial contrast of the structured illumination image data set $I_n(p)$ is evaluated (330) by subdividing the structured illumination image data set into a mosaic of small regions A, called "resolution areas", and calculating the local spatial contrast in these regions by the formula:

$$C_N(p) = \text{standard deviation of } I_n(p)/\text{mean of } I_n(p)$$

The size of the resolution areas is variable, however it must be large enough to encompass at least a single speckle grain size.

$C_N(p)$ is approximately equal to 1 when an object is in focus and approximately equal to zero when an object is out of focus. The product of $C_N(p)I_u(p)$ is equivalent to extracting the in-focus contribution of $I_u(p)$ with low resolution (resolution given by the size of A). Given that an object is generally non-uniform, two sources contribute to the measured contrast of $I_n(p)$: 1. the structured illumination and 2. variations in the object itself Thus, the variations due to the object itself should be removed in order to enhance the resolution of the image. $O(p)$ is defined as the image intensity obtained from the actual object with a substantially uniform unit illumination and $S(p)$ is defined to be the image intensity obtained from an object exposed to structured illumination.

$$I_n(p) \approx (\langle O \rangle_A + \delta O(p))(\langle S \rangle_A + \delta S(p))$$

$$I_u(p) \approx (\langle O \rangle_A + \delta O(p))(\langle S \rangle_A)$$

where the angle brackets indicate an average over the resolution area A. $\langle O \rangle_A$ and $\langle S \rangle_A$ arise from both in and out-of-focus contributions from the object and illumination, whereas the variations $\delta O(p)$ and $\delta S(p)$ arise dominantly from in-focus contributions.
Thus:
$C_N^2 \approx C_O^2 + C_S^2 + C_O^2 C_N^2$, where $C_O$ and $C_S$ are respectively the contrasts associated with $O(p)$ and $S(p)$ as calculated over the resolution area A. Recognizing $$C_O(p) = \frac{\langle \sigma_u(p) \rangle_A}{\langle I_u(p) \rangle_A},$$

where $\sigma$ indicates "standard deviation of", then $C_S$ may be derived from the equation above.

As a result of the above equations, $I_{Su}(p) = C_S(p) \langle I_u(p) \rangle_A$ provides a low resolution version of $I_u(p)$ that is optically sectioned even for DC frequencies (340).

The low resolution in-focus data set $I_{Su}(p)$ is low-pass filtered with a filter that is complementary to the high-pass filter used to obtain the high resolution data set (i.e. $LP(K) = 1 - HP(K)$ where K is spatial frequency; hence $LP(K_c) = HP(K_c) = \frac{1}{2}$). The resultant low frequency in-focus data is denoted by $I_{LP}(p)$ (350).

$I_{LP}(p)$ is combined with $I_{HP}(p)$ using the formula $I(p) = \eta I_{LP}(p) + I_{HP}(p)$, resulting in a final in-focus image that contains all spatial frequencies within the imaging bandwidth of the measuring device (360). To combine the low-pass and high-pass data sets such that the transition across the cutoff frequency $K_c$ is seamless, a scaling factor $\eta$ has been introduced. $\eta$ can be calculated by applying a bandpass filter to both $I_{LP}(p)$ and $I_{HP}(p)$, such that the bandpass filter selects only frequency components in the vicinity of the cutoff frequency $K_c$. In this way, $$\eta = \frac{|\text{bandpass filter } I_{HP}(p)|}{|\text{bandpass filter } I_{LP}(p)|}.$$

Alternatively, $\eta$ may be calculated by the formula $$\eta = \frac{|\text{bandpass filter } I_u(p)|}{|\text{bandpass filter } I_{LP}(p)|}$$

where the bandpass filter covers a frequency range at of above the cutoff frequency $K_c$. $\eta$ may or may not be spatially dependent depending on whether spatial averaging of $\eta$ is performed.

The resulting image data set $I(p)$ representing the optically sectioned structure can be stored by the processor to memory for later retrieval and display or the resulting data set can be directly displayed. The produced full resolution image is similar in resolution to an image obtained using conventional widefield microscopy.

Figure 4:
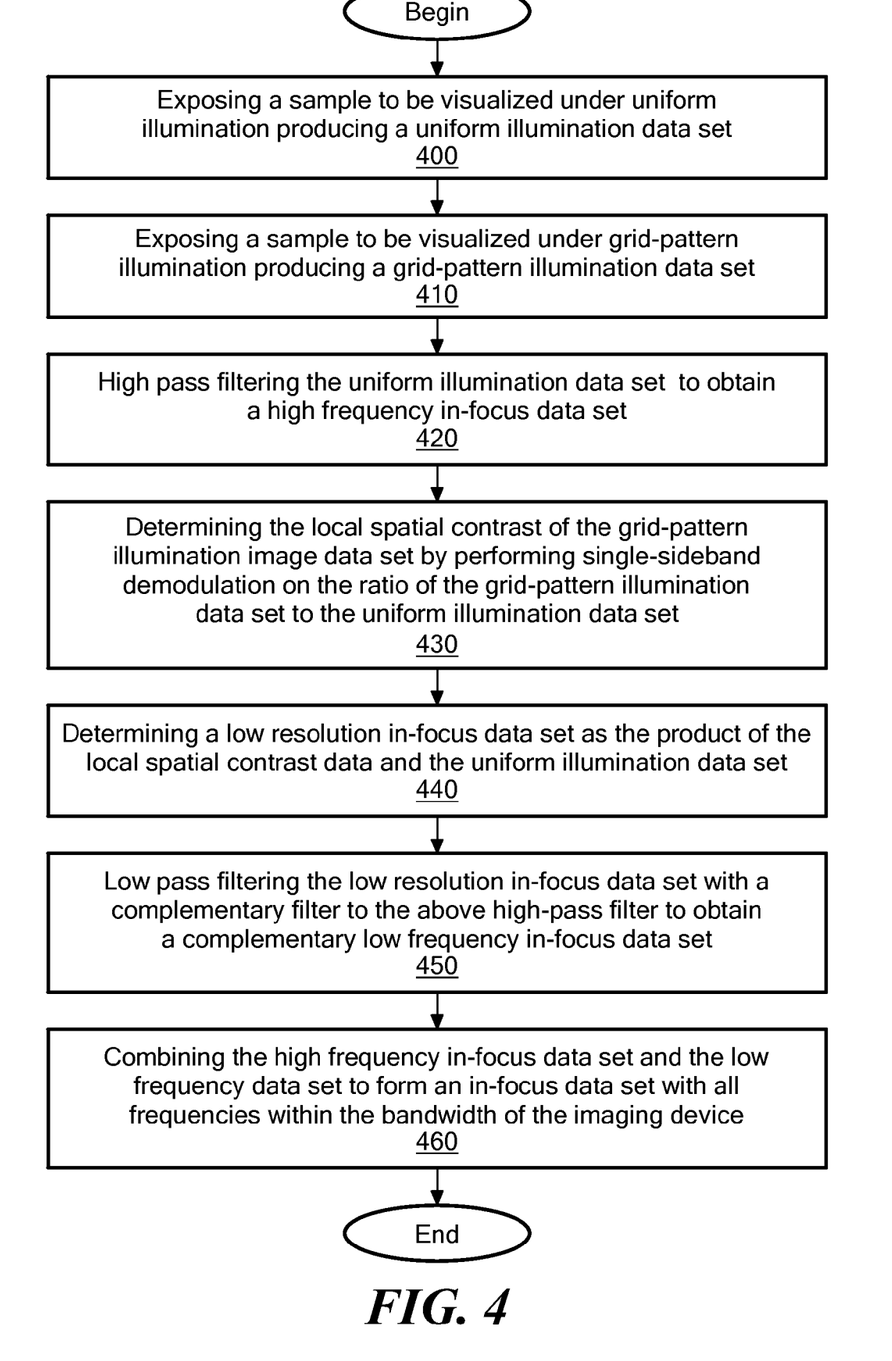
FIG. 4 is a flow chart of the methodology for producing an optically sectioned image using a grid pattern illumination as the structured illumination.

FIG. 4 is a flowchart that shows the methodology of FIG. 2 using grid-pattern illumination as the structured illumination. Image data sets are first obtained using uniform and grid-pattern illumination and received by a processor (400 and 410). The uniform illumination data set is passed through a high pass filter HP (the filter is complementary to a low pass filter LP to be used with the structured illumination data set) (420). The high frequency components in the uniform illumination data set are in-focus and are saved in memory for further processing. These are denoted by $I_{HP}(p)$.

The structured illumination image is retrieved and the local contrast in the image data is obtained. The local contrast is higher for in-focus image data than for out of focus image data and is thus axially resolved. The local image contrast is extracted using single-sideband demodulation (430).

Figure 4A:
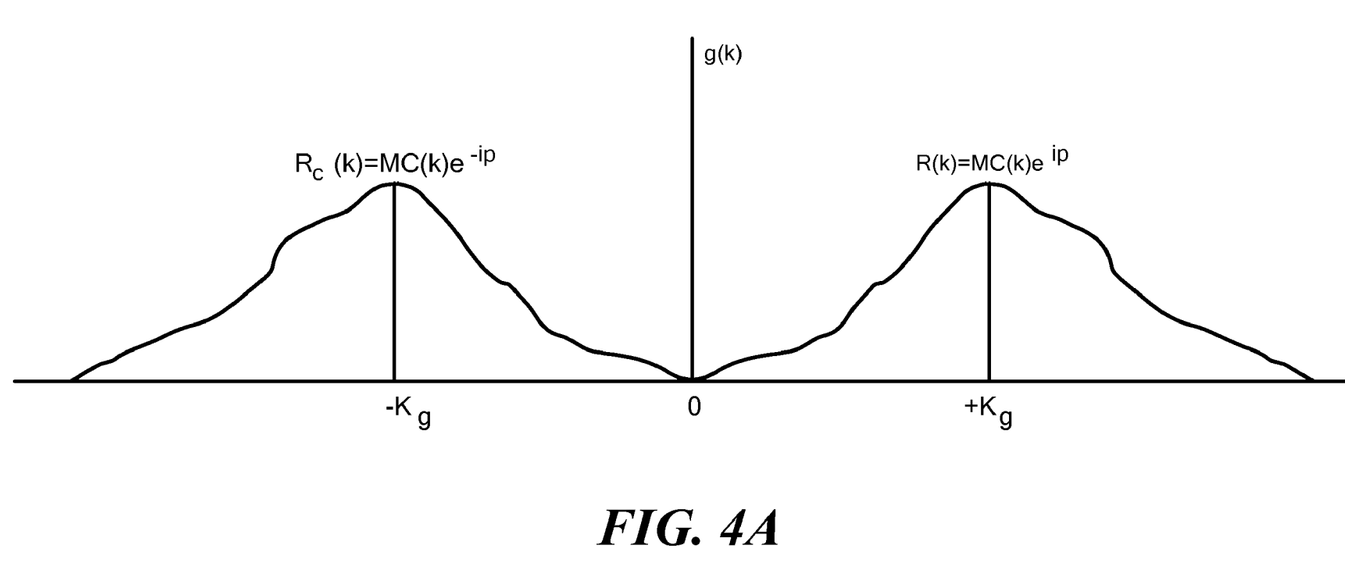
FIG. 4A is a graph of C(K).

The image data of the structured image can be decomposed into in-focus and out-of-focus data $I_n(p) = I_{in}(p)[1 + M \sin(K_g x + \phi)] + I_{out}(p)$ where p are the coordinates of the data and where the grid illumination is modeled as a sinusoidal pattern of spatial frequency $K_g$ in the x direction with arbitrary phase $\phi$ and modulation contrast M. Only in-focus image data appears to be modulated, whereas the out-of-focus data does not, precisely because the latter is out-of-focus. The ratio $R(p) = I_n(p)/I_u(p)$ leads to $R(p) = 1 + C(p) M \sin(K_g x + \phi)$ where $C(p)$ is the local image contrast. Thus, the ratio $R(p)$ is determined. $C(K)$ i.e. the Fourier transform of $C(p)$ and its complex conjugate reside in sidebands centered at + or $-K_g$ as shown in FIG. 4A The Fourier transform can be performed on $R(p)$ resulting in $R(K)$ where K is the spatial frequency. By using a single-sideband demodulation $C(K)$ can be extracted from $R(K)$. First a one-sided high-pass filter is applied to remove the negative conjugate followed by an inverse Fourier transform to retrieve $R(p)$. Provided that the sidebands are well separated from one another (i.e. that they do not overlap) then the local image contrast is given by $C(p) = [R_+(p) R^*_-(p)]^{1/2}/M$. As a result, $I_{in}(p) = C(p) I_u(p)$ and (440) $I_{in}(p)$ can be determined.

In general M is not known a priori, and thus a new parameter is used $I_{su}(p)$. $I_{su}(p) = [R_+(p) R^*_+(p)]^{1/2} I_u(p)$. Thus $I_{su}(p)$ is determined based upon the ratio data set $R(p)$ and the structured illumination data set. $I_{su}(p)$ is restricted to spatial frequencies smaller than $K_g$ by applying a low-pass filter to $I_{su}(p)$ with a defined cutoff frequency of $K_c$ where $K_c$ is less than or equal to $K_g$. $LP[I_{su}(p)]$ may be obtained by convolving $I_{su}(p)$ with a window of size $2\pi/K_g$. In addition to confining $I_{su}(p)$ to a well-defined bandwidth, such filtering helps suppress potential artifacts arising from, for example, a non-perfect sinusoidal illumination pattern. This low pass filter results in the production of a low frequency in-focus data set, denoted by $I_{LF}(p)$ (450).

The high frequency in-focus data set $I_{HP}(p)$ and the low frequency in-focus data sets $I_{LF}(p)$ are then combined together (460). It should be noted that the $HP[I_u(p)] = I_u(p) - LP[I_u(p)]$. The final processed image is given by $I(p) = \eta I_{LP}(p) + I_{HP}(p)$, where a scaling factor $\eta$ is introduced to ensure a seamless transition of the frequency content across the cutoff frequency $K_c$. $\eta$ can be calculated in the same manner as described above. The resulting in-focus data set $I(p)$ can then be stored to memory for later retrieval or displayed on a display device.

The flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, graphical processing unit, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, C#, JAVA, Labview, Matlab, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internet-working technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An imaging for use with a processor for producing an optically-sectioned data set of a real-world object, the method comprising:
   receiving at the processor a first image data set of the real-world object that was illuminated with substantially uniform illumination;
   receiving at the processor a second image data set of the real-world object that was illuminated with substantially structured illumination;
   processing the first image data set producing a high-frequency in-focus data set;
   processing the second image data set producing a low-frequency in-focus data set; and
   combining the high frequency in-focus data set and the low-frequency in-focus data set to produce an optically-sectioned in-focus data set;
   wherein processing the first image data set includes:
   applying a high pass filter to the first-image data set to substantially remove out-of-focus content and obtain the high frequency in-focus image data set; and
   wherein processing the second image data set includes:
   determining local contrast of the second-image data set producing a low resolution local contrast data set;
   multiplying the low resolution local contrast data set with the first-image data set to extract low resolution in-focus content from the first-image data set.

2. The imaging method according to claim 1, further comprising:
   displaying the optically-sectioned in-focus data set on a display device.

3. The imaging method according to claim 1, wherein processing the second image data set further includes:
   applying a low pass filter is complementary with the high pass filter.

4. The imaging method according to claim 3 wherein the optically-sectioned data set contains all frequency content within the bandwidth of the optical imager producing the first and second data sets.

5. The imaging method according to claim 1, wherein determining local contrast includes:
   adjusting the local contrast to compensate for object contrast using the first-image data set.

6. The imaging method according to claim 1, wherein determining local contrast includes adjusting the local contrast to compensate for noise-induced contrast in the second-image data set by using the first-image data set.

7. The imaging method according to claim 1, wherein the local contrast is determined by evaluating a local image standard deviation.

8. The imaging method according to claim 1, wherein the local contrast is determined in part using single sideband demodulation.

9. The imaging method according to claim 1, wherein the local contrast is determined in part using double sideband demodulation.

10. The imaging method according to claim 1, further comprising:
    recording with an optical imager a first-image data set representative of the real-world object using near uniform illumination wherein the first-image data set contains both in-focus and out-of-focus content; and
    recording with the optical imager a second-image data set representative of the real-world object using structured illumination so that the second-image data set is spatially modulated.

11. The imaging method according to claim 10 wherein the optical imager includes an optical detector array.

12. The imaging method according to claim 11 wherein the optical imager includes an illumination source.

13. A computer program for use with a computer comprising a non-transitory computer readable medium having computer code thereon for producing an optically-sectioned data set of a real-world object, the computer code comprising:
    computer code for receiving a first image data set of the real-world object that was illuminated with substantially uniform illumination;
    computer code for receiving a second image data set of the real-world object that was illuminated with substantially structured illumination;
    computer code for processing the first image data set producing a high-frequency in-focus data set;
    computer code for processing the second image data set producing a low-frequency in-focus data set; and
    computer code for combining the high frequency in-focus data set and the low frequency in-focus data set to produce an optically-sectioned in-focus data set;
    wherein the computer code for processing the first image contains;
    computer code for applying a high pass filter to the first-image data set to substantially remove out-of-focus content and
    wherein the computer code for processing the second image contains;
    computer code for determining local contrast of the second-image data set producing a local contrast data set; and
    computer code for multiplying the local contrast data set with the first-image data set producing a low resolution in-focus data set.

14. The computer programme according to claim 13, wherein the computer code for processing the second image further comprises:
    computer code for applying a low pass filter to the low resolution in-focus data set.

15. The computer program according to claim 13, wherein the computer code for determining local contrast includes:
    computer code to compensate for object contrast in the second-image data set using the first-image data set.

16. The computer program according to claim 13, wherein the computer code for determining local contrast includes:
    computer code to compensate for noise-induced contrast in the second-image data set using the first-image data set.

17. The computer program product according to claim 13, wherein the computer code for determining local contrast determines the local contrast by evaluating a local image standard deviation.

18. The computer program according to claim 13, wherein the computer code for determining local contrast uses single sideband demodulation.

19. The computer program according to claim 13, wherein the computer code for determining local contrast uses double sideband demodulation.

20. A system for producing an optically-sectioned image of a real-world object, the system comprising:
    an illumination source;
    a spatial pattern generator;
    an optical detector array; and
    a processor for receiving from the optical detector array a first image data set and a second image data set wherein the first image data set is produced in response to the illumination source and the second image data set is produced in response to the illumination source and the spatial pattern generator, the processor producing an optically-sectioned image by combining high frequency in-focus data from the first image data set with low frequency in-focus data from the first and second image data sets.

21. The system according to claim 20 wherein the illumination source includes at least a first and a second illumination source.

22. The system according to claim 21 wherein the first illumination source can uniformly illuminate the real-world object.

23. The system according to claim 21 wherein the second illumination source along with the spatial pattern generator can structurally illuminate the real-world object.

24. The system according to claim 20 wherein the spatial pattern generator is a spatial light modulator.

25. The system according to claim 20 wherein the spatial pattern generator is a diffuser.

26. The system according to claim 20, wherein the spatial pattern generator generates a geometric pattern when exposed to the illumination source.

* * * * *

UNITED STATES PATENT AND TRADEMARK OFFICE
CERTIFICATE OF CORRECTION

PATENT NO. : 8,310,532 B2  Page 1 of 1
APPLICATION NO. : 12/994413
DATED : November 13, 2012
INVENTOR(S) : Jerome Mertz et al.

It is certified that error appears in the above-identified patent and that said Letters Patent is hereby corrected as shown below:

In Col. 13, Line 45
replace "The computer programme"
with "The computer program"

Signed and Sealed this
Twelfth Day of March, 2013

Teresa Stanek Rea
*Acting Director of the United States Patent and Trademark Office*